May 28, 1963
R. T. MARETTE
3,091,258
HOSE ACCUMULATOR
Filed Feb. 5, 1960
4 Sheets-Sheet 1
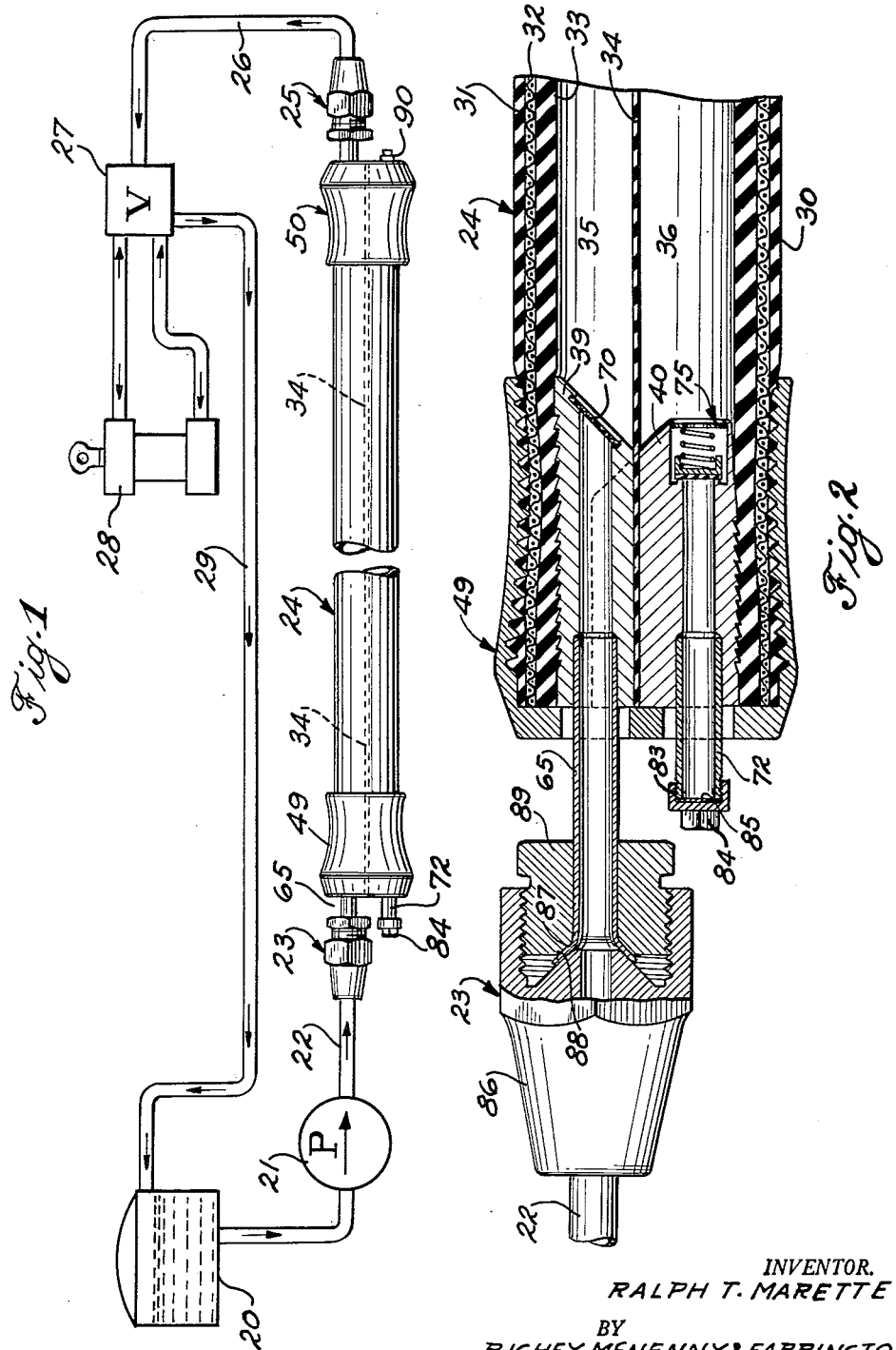
INVENTOR.
RALPH T. MARETTE
BY
RICHEY, McNENNY & FARRINGTON
H. F. McNenny
ATTORNEYS

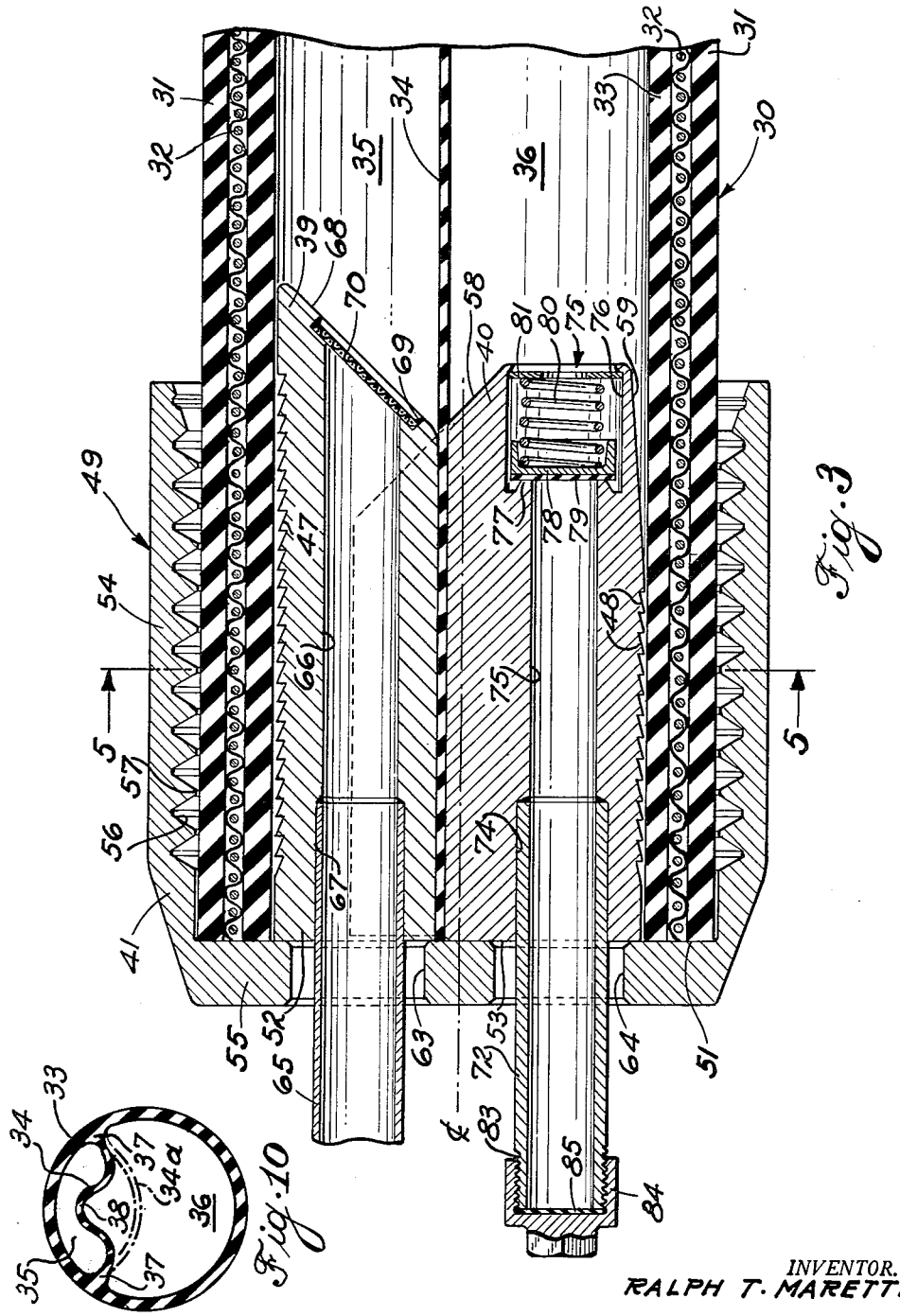

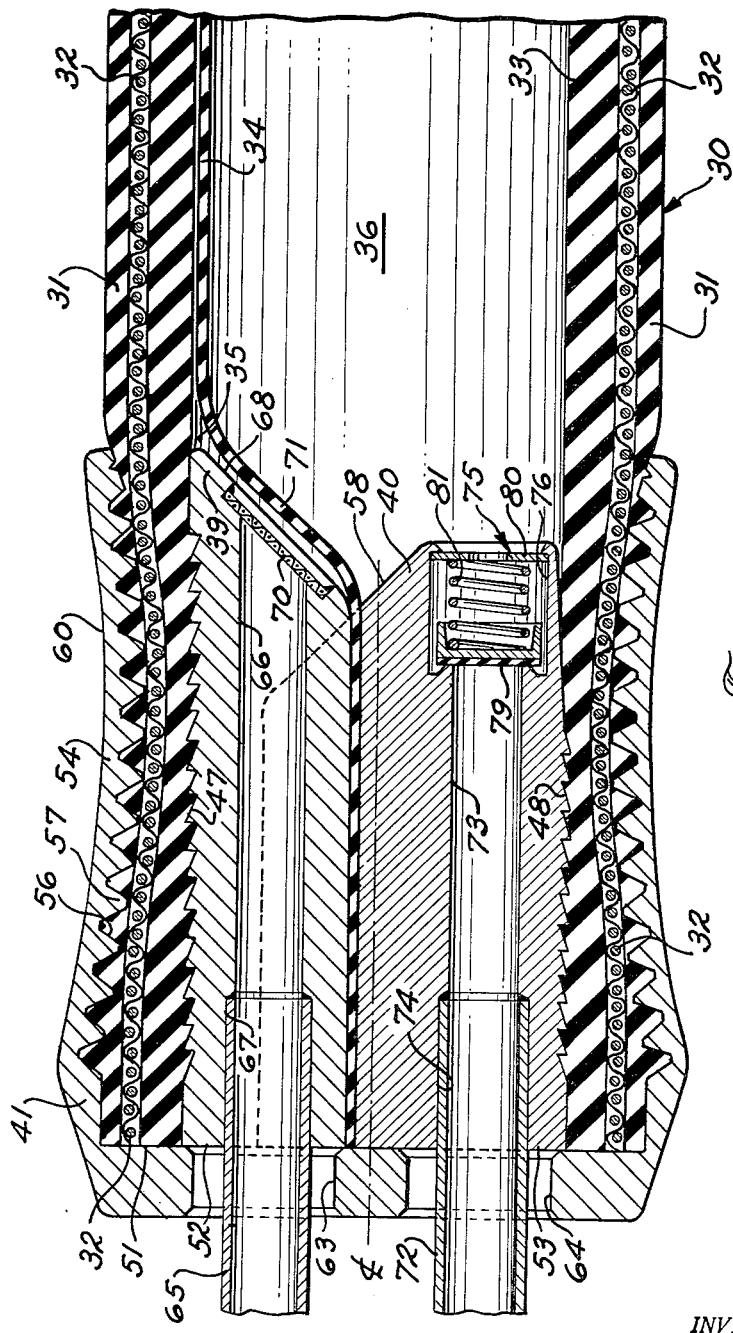

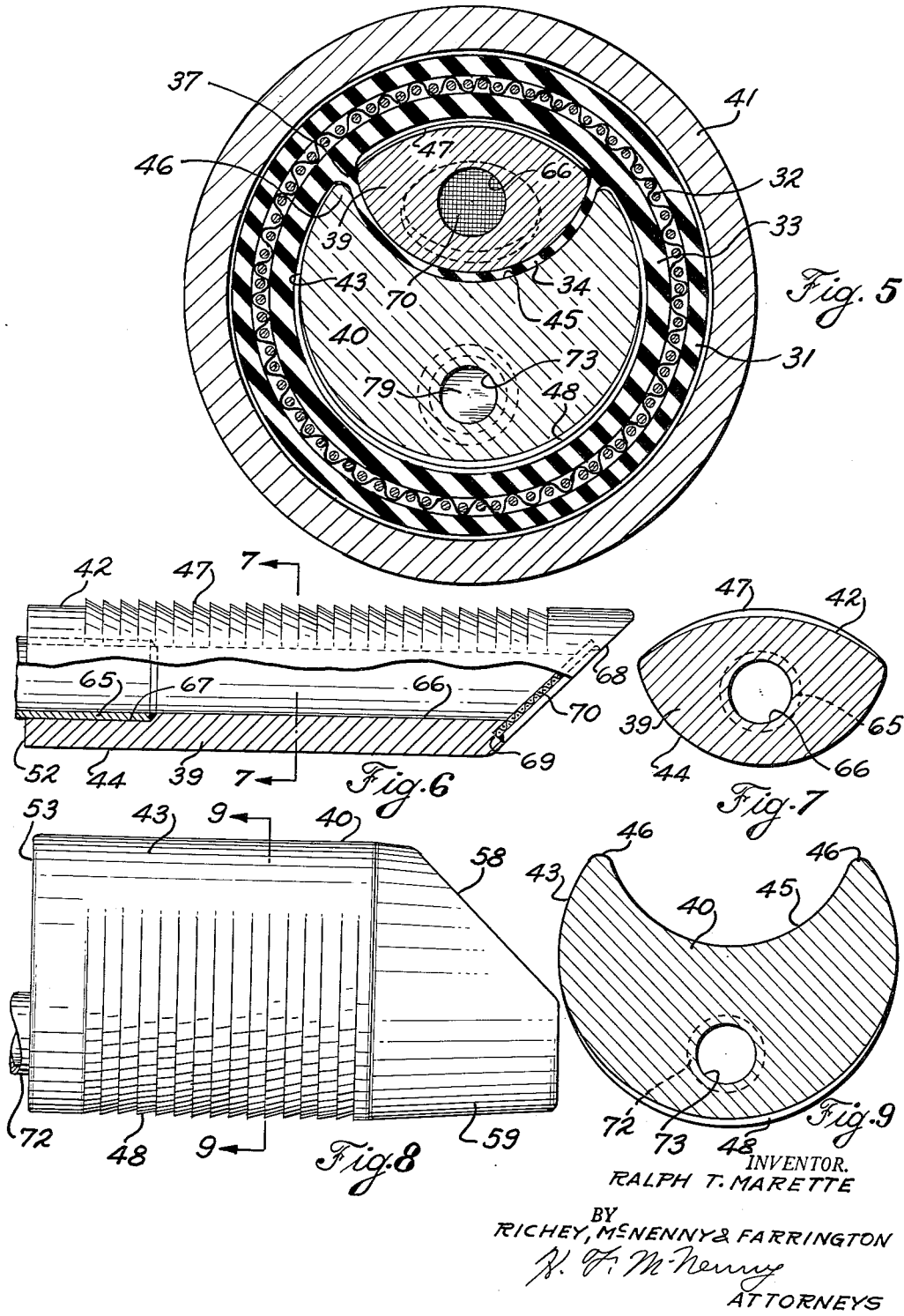

United States Patent Office 3,091,258
Patented May 28, 1963

3,091,258
HOSE ACCUMULATOR
Ralph T. Marette, Cleveland Heights, Ohio, assignor to The Weatherhead Company, Cleveland, Ohio, a corporation of Ohio
Filed Feb. 5, 1960, Ser. No. 6,897
4 Claims. (Cl. 138—30)

This invention relates to hydraulic accumulators and more particularly to a hydraulic accumulator which is formed as an integral part of a hydraulic pressure hose line.

A principal object of this invention is to provide a gas-loaded hydraulic accumulator unit which functions both as a hydraulic accumulator and as a flexible hose assembly.

Another object of this invention is to provide a combined hydraulic accumulator and flexible hose assembly for use in a hydraulic power system which will provide sufficient fluid storage capacity without any additional or separate accumulators in the system.

Another object of this invention is to provide a gas-loaded hydraulic accumulator in the form of an elongated hydraulic hose having an axially extending internal diaphragm which separates the hose interior into a hydraulic chamber and a gas chamber extending lengthwise along the full length of the hose, with the hydraulic chamber having an opening at each end.

Another object of this invention is to provide a gas-loaded hydraulic accumulator in the form of an elongated flexible hose assembly in which the diaphragm between the fluid chamber and the gas chamber is made of a flexible, resilient material such as rubber and changes shape by a flexing action without stretching to accommodate the proportional change in volume between the two chambers.

Another object of this invention is to provide a combination gas-loaded hydraulic accumulator and flexible hose assembly which is capable of functioning both as an accumulator and as a pulsation damper for dampening pressure pulsations and variations which may occur in the hydraulic circuit.

Still another object of this invention is to provide a gas-loaded hydraulic accumulator which functions as a flexible hose assembly and occupies a minimum of space and which is capable of being bent and flexed in accordance with the spatial configuration of the hydraulic power system.

Another object of this invention is to provide a gas-loaded hydraulic accumulator in the form of a flexible hose assembly having resilient rubber walls of sufficient strength to withstand high pressures without a metal case which may produce flying metal fragments should the accumulator explode.

Still another object of the present invention is to provide a gas-loaded hydraulic accumulator in the form of a flexible hydraulic hose which is internally divided by a flexible diaphragm formed integrally with the internal hose liner wall into axially extending gas and fluid compartments and which allows the maximum accumulator capacity to be selectively determined by specifying the length of hose used in the accumulator assembly.

Additional objects and features of this invention, together with the particular manner in which such objects and features may be realized, will become apparent to those skilled in the art upon an understanding of the invention, a preferred form of which is described in the following detailed description and shown in the accompanying drawings in which:

FIG. 1 is a schematic view of a hydraulic power system incorporating an accumulator according to the present invention;

FIG. 2 is an enlarged longitudinal sectional view of the inlet end of the accumulator shown in FIG. 1;

FIG. 3 is an enlarged longitudinal sectional view of the inlet end fitting of the accumulator before crimping;

FIG. 4 is a sectional view similar to FIG. 3 but after the end fitting has been crimped and the accumulator charged with gas;

FIG. 5 is a cross-sectional view taken on line 5—5 of FIG. 3;

FIG. 6 is a side elevational view partly in section of the fluid chamber inlet plug;

FIG. 7 is a cross-sectional view taken on line 7—7 of FIG. 6;

FIG. 8 is a side elevational view of the gas chamber inlet plug;

FIG. 9 is a cross-sectional view taken on line 9—9 of FIG. 8; and

FIG. 10 is a cross-sectional view of the hose liner in its extruded shape.

A hydraulic circuit is shown schematically in FIG. 1 to illustrate a typical hydraulic power circuit application incorporating the present invention to serve both as a hydraulic accumulator and as a portion of the hydraulic pressure line in the circuit. The circuit is shown as including a fluid reservoir 20 from which the hydraulic fluid is pumped by a suitable pump means 21 into a high pressure hydraulic line 22. Line 22 leads to an inlet coupling 23 located at one end of the hydraulic accumulator indicated in its entirety at 24. At the other end of accumulator 24 is located an outlet coupling 25 which is connected to another pressure line 26 leading to a suitable operating valve 27. A typical load or working cylinder 28 has been shown operatively connected to the valve 27, and the hydraulic circuit is completed by a return or drain line 29 which leads from the drain port of valve 27 back into reservoir 20.

The accumulator 24 comprises a flexible body or casing in the form of a hose member 30 having a diameter and length chosen to provide the desired capacity for the accumulator. In the form shown, the hose 30 is circular in cross section and is made of an outer cover 31 of rubber or other similar material which overlies a braided wire or fabric cord layer 32. Both of these layers are formed in the usual manner for high pressure hose construction, although it is understood that in accordance with the operating pressure requirements of the hydraulic system, other hose constructions and configurations may be employed. Within the braided layer 32 is an inner liner 33 made of soft, flexible rubber and having a web diaphragm 34 formed integrally with the liner and extending laterally across the hose from wall to wall for the full length of the hose. The resulting hose assembly is reasonably flexible and yet has sufficient bursting strength to withstand pressures of several thousand pounds per square inch.

The diaphragm 34 serves to separate the interior of the hose liner axially into a fluid chamber 35 and a gas chamber 36 having proportionate volumes as described in greater detail hereinafter. As shown in broken lines 34a in FIG. 10, the diaphragm 34 is roughly arcuate in shape when in the position to give the fluid chamber 35 the maximum possible volume without resulting in any stretching of the diaphragm. When the volume of fluid chamber 35 decreases as a result of fluid being withdrawn therefrom under action of the pressure within gas chmaber 36, the diaphragm 34 flexes outwardly toward the wall of hose liner 33 and moves into contact with the liner wall when the volume of fluid chamber 35 is reduced to a minimum. To aid in this flexing action of the diaphragm 34, the points of junction 37 between diaphragm 34 and hose liner 33 are made somewhat thicker than the center section 38 of diaphragm 34, which remains relatively thin and flexible to insure that the diaphragm will flex readily as the volume of fluid chamber 35 is increased and decreased. To provide a sufficient length to the diaphragm 34 between the junction points 37 to allow proper flexing action, the hose liner 33 is preferably initially extruded with diaphragm 34 in a corrugated or folded shape as seen in cross section (see FIG. 10). By controlling the size of folds, the unstretched width of the diaphragm between the junction points 37 may be controlled to thereby determine the maximum volume for the fluid chamber 35. In addition, the lines of the folds provide natural fold lines along which the diaphragm may flex. However, it is understood that the hose liner 33 and diaphragm 34 may have other configurations and that the flexing pattern of diaphragm 34 may be varied as required.

The ends of the hose member 30 are closed off by suitable closure fittings, of which only the inlet end fitting 49 has been shown in detail, it being understood that the outlet end fitting 50 is similar to the inlet fitting 49 except for minor differences as described hereinafter. These hose end fittings are made of a suitable metal such as steel, although other metals such as brass and aluminum may be used depending upon the strength requirements according to the pressure at which the accumulator is to be used. Generally, the end fittings include a fluid chamber plug 39, a gas chamber plug 40, and a cup-shaped end cap 41. The chamber plugs 39 and 40 are formed to have the same cross-sectional shape as have their respective chambers when the fluid chamber 35 is at its maximum volume with diaphragm 34 in the position as shown in FIGS. 3 and 5. Accordingly, the chamber plugs 39 and 40 have outer peripheries 42 and 43, respectively, lying along a common cylindrical surface corresponding to the inner surface of hose liner 33. To accommodate the diaphragm 34 between the chamber plugs 39 and 40, the fluid chamber plug 39 has a curved convex surface 44 and the gas chamber plug 40 has a similarly curved concave surface 45. Both of these surfaces 44 and 45 are formed to receive the diaphragm between them in clamping relationship when the end fitting is assembled, and to accommodate the thickened portion of the diaphragm 34 at junction points 37, the gas chamber plug 40 has rounded corners 46 at the junction between its outer periphery 43 and its concave surface 45.

In order to prevent axial movement of the chamber plugs 39 and 40 within hose liner 33 as a result of the pressure on their inner ends, the outer peripheries 42 and 43 are provided with series of spaced arcuate serrations 47 and 48, respectively, whcih grip the inner wall of the hose liner 33. In the assembly of the hose inlet end fitting 49 with the hose member 30, the hose member is first cut to present a square end 51. It will be noted that the outer cover 31, braided layer 32, inner liner 33 and diaphragm 34 all extend even with cut end 51 which lies perpendicular to the axis of the hose member 30. The fluid chamber plug 39 is now inserted within the fluid chamber 35 until the outer end 52 of plug 39 is flush with hose end 51. In like manner, the gas chamber plug 40 is now inserted in gas chamber 36 until the outer end 53 of plug 40 is also flush with hose end 51. To aid in the insertion of gas chamber plug 40, the plug has an oblique end portion 58 and its inner end is provided with a slightly tapered conical portion 59. The end cap 41 is now slipped over the end of the hose member 30 until the bottom or end portion 55 comes into contact with hose end 51 and the plug ends 52 and 53. The cylindrical side wall portion 54 of end cap 41 is formed to slide freely over the outer hose cover 31 so that this assembly may be made without excessive force and without scuffing or abrading the outer cover 31.

It will be noted that the cylindrical side wall portion 54 has a series of spaced V-grooves 56 on its inner surface, these V-grooves 56 being spaced to form annular ridges 57. To lock this hose end assembly 49 in position, the end cap 41 is now crimped by a suitable crimping or rolling machine to bend the cylindrical side wall portion 54 inward from its shape as shown in FIG. 3 to its reduced or crimped shape 60 as shown in FIG. 4. When the end cap 41 has thus been crimped, the annular ridges 57 are forced into the outer hose cover 31 until the cover extrudes outwards and fills the V-grooves 56. This action forces the braided layer 32 inward to compress the hose liner 33 into the arcuate serrations 47 and 48 on the chamber plugs 39 and 40. When the end cap 41 has been fully crimped, the gripping relation between the end cap and the chamber plugs provides a rigid and leak-proof seal for fluid chamber 35 and gas chamber 36.

To provide inlets for fluid chamber 35 and gas chamber 36, the end wall portion 55 of end cap 41 is provided with a pair of cylindrical openings 63 and 64. To permit fluid to pass into fluid chamber 35, an inlet pipe 65 extends inwardly through opening 63 to connect with a longitudinal bore 66 extending axially through fluid chamber plug 39. Inlet pipe 65 fits within a counterbore 67 in plug 39 and is held in place therein by brazing or welding in the usual manner. It will be noted that the inner end of fluid chamber plug 39 has an oblique end surface 68. This oblique surface allows the diaphragm 34 to form a gradual bend as indicated at 71 when the fluid chamber 35 is emptied and the diaphragm 34 is in the position adjacent the wall of hose liner 33. To prevent the diaphragm 34 from being forced into the inlet bore 66 in fluid chamber plug 39 by the pressure in gas chamber 36, oblique end surface 68 is provided with a shallow recess 69 extending around bore 66 and in which is fitted a supporting screen 70.

The charging of gas chamber 36 is effected by a gas inlet pipe 72 which extends inward through end cap opening 64 and is fitted within a counterbore 74 within the gas chamber plug 40. A longitudinal bore 73 extends axially inward through gas chamber plug 40 from inlet pipe 72 and is fitted at its inner end with a check valve 75 to prevent the escape of gas from within gas chamber 36. Check valve 75 is fitted within a counterbore 76 which is formed to include a valve seat 77 at the junction between counterbore 76 and bore 73. A disc 78 is fitted within counterbore 76 and carries a seal 79 on its outer face to make sealing contact with valve seat 77 under the force of a compression spring 80. To hold compression spring 80 in position, the outer end 76 is partially closed by a washer 81 which is secured in place by staking or crimping. At its outer end, inlet pipe 72 has a threaded portion 83 to receive a removable pipe cap 84. This pipe cap 84 carries a seal 85 to make sealing contact across the end of inlet pipe 72 both to prevent the entry of dirt and foreign matter into inlet pipe 72 and to act as an additional seal against the escape of gas through check valve 75 from the gas chamber 36.

The fluid inlet pipe 65 may be connected to the hydraulic supply line by means of any of the usual tube couplings. For purposes of illustration, inlet coupling 23 has been shown as being of the inverted flare type, although any type of coupling having a sufficiently high pressure rating as required by the system pressure may be used. Inlet coupling 23 includes a connector member 86 which is secured to pressure supply line 22 leading from pump 21. The outer end of inlet pipe 65 is formed into a flare 87 which engages a flare seat 88 on connector member 86 in the usual manner and is locked in position by nut 89.

At the outlet end of accumulator 24, hose member 30 is closed off by outlet end fitting 50 which is similar to the inlet hose end fitting 49 except that the gas chamber plug is not provided with a gas inlet pipe or check valve, and the gas chamber 36 is sealed off by a suitable drain plug 90. Outlet coupling 25 is preferably of the same type as inlet coupling 23 and connects the accumulator to the output pressure line 26.

In one size of the accumulator, the inner liner 33 is made with an inside diameter of one and one-half inches. The hose 30 is selected to have a length of two feet to give a total volume for the gas and fluid chambers of approximately thirty-five cubic inches. Diaphragm 34 is positioned within liner 33 so that the fluid chamber 35 has a maximum volume of ten cubic inches, leaving a volume of twenty-five cubic inches for the gas chamber 36. Gas chamber 36 is charged with a suitable gas, such as compressed air or nitrogen, while the fluid chamber 35 is empty and unpressurized, and is filled to a precharged pressure of approximately fifteen hundred pounds per square inch, the gas chamber then occupying the entire volume of thirty-five cubic inches. The hydraulic system is regulated to provide a maximum pressure of approximately two thousand pounds per square inch, so that under this pressure the fluid chamber 35 will expand almost to its full volume of ten cubic inches and compress the gas chamber 36 to a volume of twenty-five cubic inches with a resulting gas pressure of two thousand pounds per square inch.

As long as the pump is able to supply as much fluid to the inlet of the accumulator as is withdrawn at the outlet, the fluid chamber 35 will remain full of fluid. However, if the outlet demand exceeds the pump capacity, or if the pump is stopped, fluid is still available from the accumulator 24 which would then provide a reserve fluid volume of ten cubic inches. This fluid is then supplied under a pressure which would initially be the full two thousand pounds per square inch of the system, but would decrease to fifteen-hundred pounds per square inch as the last of the fluid is withdrawn from fluid chamber 35. It should be noted that the pressure supplied to the inlet of fluid chamber 35 is limited to a value equal to that of the pressure in gas chamber 36 when diaphragm 34 is in the position giving the maximum volume to fluid chamber 35. If the inlet pressure is increased beyond this value, or if the pressure in gas chamber 36 is reduced below this value, a pressure unbalance will result tending to further increase the volume of fluid chamber 36 beyond that provided by the flexing of diaphragm 34 and resulting in excessive stretching and possible damage to the diaphragm.

When the accumulator is used with a hydraulic system in which there are pressure surges and pulsation, the accumulator provides a dampening action by virtue of the change in volume of the fluid chamber under the action of these pressure changes. If such pulsations are encountered often or if they are of relatively large magnitude, the accumulator may be operated without expanding the fluid chamber to its maximum volume, as may be done by increasing the pre-charge pressure in the gas chamber. Such operation allows for further expansion of the fluid chamber by pulsation pressure without causing the diaphragm to stretch and causes only a slight loss of the useful hydraulic storage capacity as measured by the volume of fluid stored in the accumulator.

Although the accumulator has been shown and described as functioning in a dual capacity as both an accumulator and as a hydraulic pressure line, it is understood that the accumulator can be used solely as for storage purposes. In such usage, the accumulator need not be provided with a separate inlet and outlet placed at opposite ends of the hose member. The present fluid inlet can serve as both the inlet and the outlet, in which case the other end of the hose member is sealed off by making both of the chamber plugs at that end solid.

The accumulator can be constructed in other ways than that described hereinabove. For example, instead of using an extruded bore liner with its integral diaphragm, the liner can be a plain tube with a pair of smaller tubes for the fluid and gas chambers inserted inside and vulcanized together as a unit. In this case, the walls of the smaller tubes serve directly as the diaphragm.

Although only one embodiment of this invention has been shown in the drawings and described in detail hereinabove, it is understood that other arrangements and embodiments will occur to those skilled in the art and may be resorted to without departing from the scope of the present invention as defined in the claims.

I claim:

1. An accumulator comprising a tubular casing, a resilient liner extending over the inner wall of said casing, a flexible diaphragm within said casing, said diaphragm being joined laterally to said resilient liner and extending longitudinally thereof, said diaphragm separating the interior of said casing into a fluid chamber and a gas chamber, closure means at each end of said casing, said closure means including fitting means at one end of said casing, said fitting means having a passage to admit fluid into said fluid chamber.

2. An accumulator comprising a flexible tubular casing, a resilient liner extending over the inner wall of said casing, a flexible diaphragm within said casing, said diaphragm being joined laterally to said resilient liner and extending longitudinally thereof, said diaphragm having a width greater than the distance between the points of joinder to said inner casing wall, said diaphragm separating the interior of said casing into a fluid chamber and a gas chamber, closure means at each end of said casing, said closure means including fitting means at one end of said casing, said fitting means having a passage to admit the fluid into said fluid chamber.

3. An accumulator comprising a tubular casing, a resilient liner extending over the inner wall of said casing, a flexible diaphragm within said casing, said diaphragm being joined laterally to said resilient liner and extending longitudinally thereof, said diaphragm separating the interior of said casing into a fluid chamber and a gas chamber, first fitting means at one end of said casing, second fitting means at the other end of said casing, a valve in one of said fitting means to admit gas into said gas chamber, said first fitting means having an inlet to admit fluid into said fluid chamber, and said second fitting means having an outlet from said fluid chamber.

4. An accumulator comprising a tubular casing, said tubular casing having flexible walls to permit axial deflection of said casing, a resilient liner extending over the inner wall of said casing, a flexible diaphragm within said casing, said diaphragm being joined along its edges to the inner side of said resilient liner to extend longitudinally thereof, transversely between oppositely disposed wall portions, said diaphragm separating the interior of said casing into a fluid chamber and a gas chamber, said diaphragm having a lateral width greater than the shortest arc length along the inner surface of said liner wall between the junctions of said diaphragm and said liner, first fitting means at one end of said casing, second fitting means at the other end of said casing, said first fitting means having an inlet to admit fluid into said fluid chamber, and said second fitting means having an outlet connected to said fluid chamber.

References Cited in the file of this patent

UNITED STATES PATENTS

| | | |
|---|---|---|
| 1,852,427 | Lopatin | Apr. 5, 1932 |
| 2,165,884 | Chamberlin et al. | July 11, 1939 |
| 2,261,948 | Beach | Nov. 11, 1941 |
| 2,612,215 | Edwards | Sept. 30, 1952 |
| 2,753,215 | Barr | July 3, 1956 |
| 2,838,073 | Di Mattia et al. | June 10, 1958 |
| 2,852,033 | Orser | Sept. 16, 1958 |